United States Patent
Winn

[15] 3,670,333
[45] June 13, 1972

[54] AUTOMATIC SWEEP ELECTRONIC COUNTERMEASURES SYSTEM
[72] Inventor: Oliver H. Winn, Whitesboro, N.Y.
[73] Assignee: General Electric Company
[22] Filed: April 27, 1960
[21] Appl. No.: 25,165

[52] U.S. Cl. .......................................................... 343/18 E
[51] Int. Cl. .................................................................. H04k 3/00
[58] Field of Search .............................. 343/18; 250/17 AM

[56] References Cited
UNITED STATES PATENTS
2,567,261  9/1951  Williams .................................. 343/18
2,862,203  11/1958  Skaraeus et al. .......................... 343/18
2,953,677  9/1960  Preisman .................................. 343/18

Primary Examiner—T. H. Tubbesing
Attorney—Oscar B. Waddell, Frank L. Neuhauser, Dudley T. Ready and Irving M. Freedman

EXEMPLARY CLAIM

1. An automatic sweep jamming system having a high duty cycle and rapid acquisition rate for jamming victim transmission systems comprising transmitter means capable of being swept very rapidly over a prescribed frequency spectrum for radiating electromagnetic energy, tuning control means coupled to said transmitter for sweeping said spectrum repetitively, receiver means capable of rapidly sweeping said prescribed frequency spectrum to detect electromagnetic energy from victim transmission systems, and means including said transmitter, said tuning control means and receiver means for automatically reducing the sweep rate of said transmitter means for a predetermined period in response to detection of victim electromagnetic energy.

6 Claims, 7 Drawing Figures

IDEAL SWEEP ACTION

Inventor:
Oliver H. Winn,
by Allen E. Amgott
His Attorney.

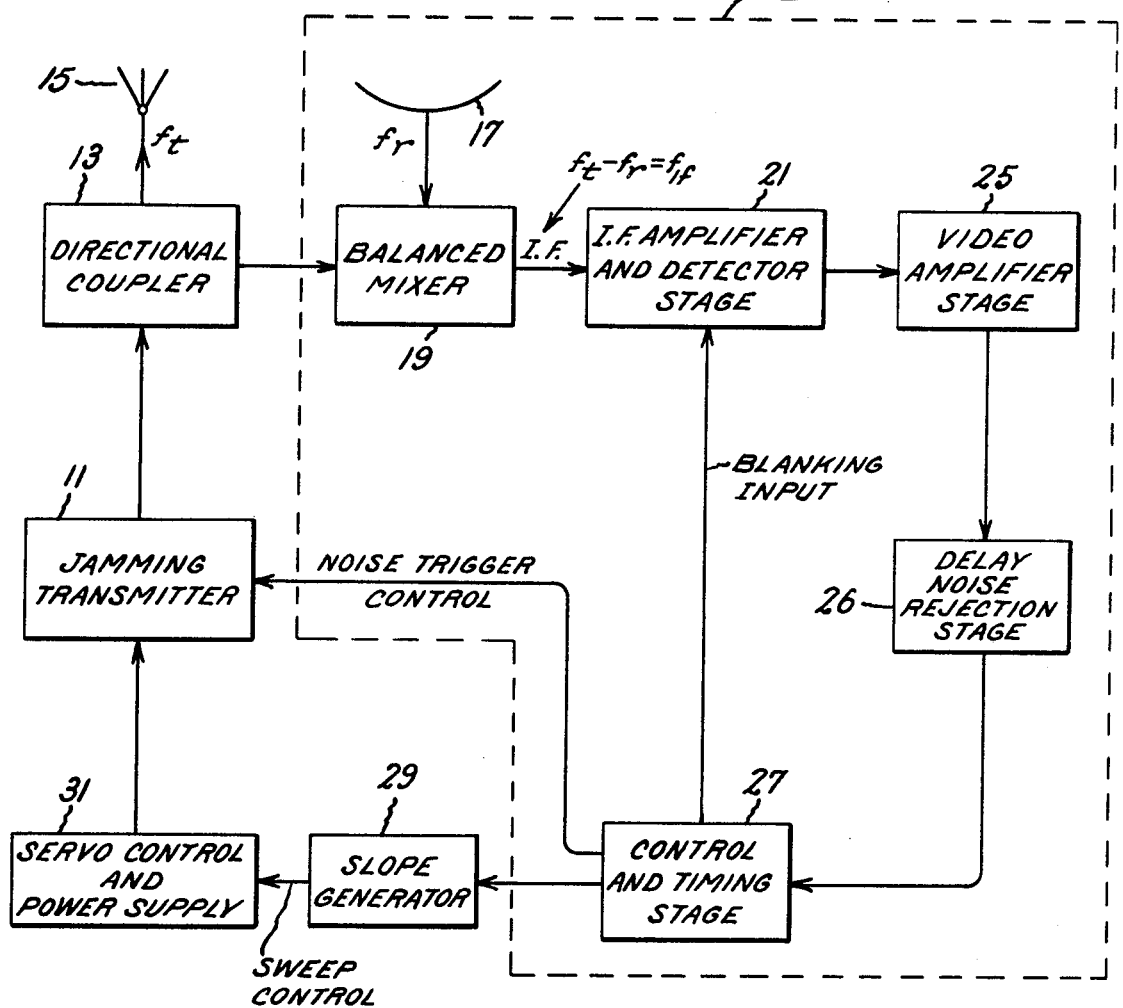

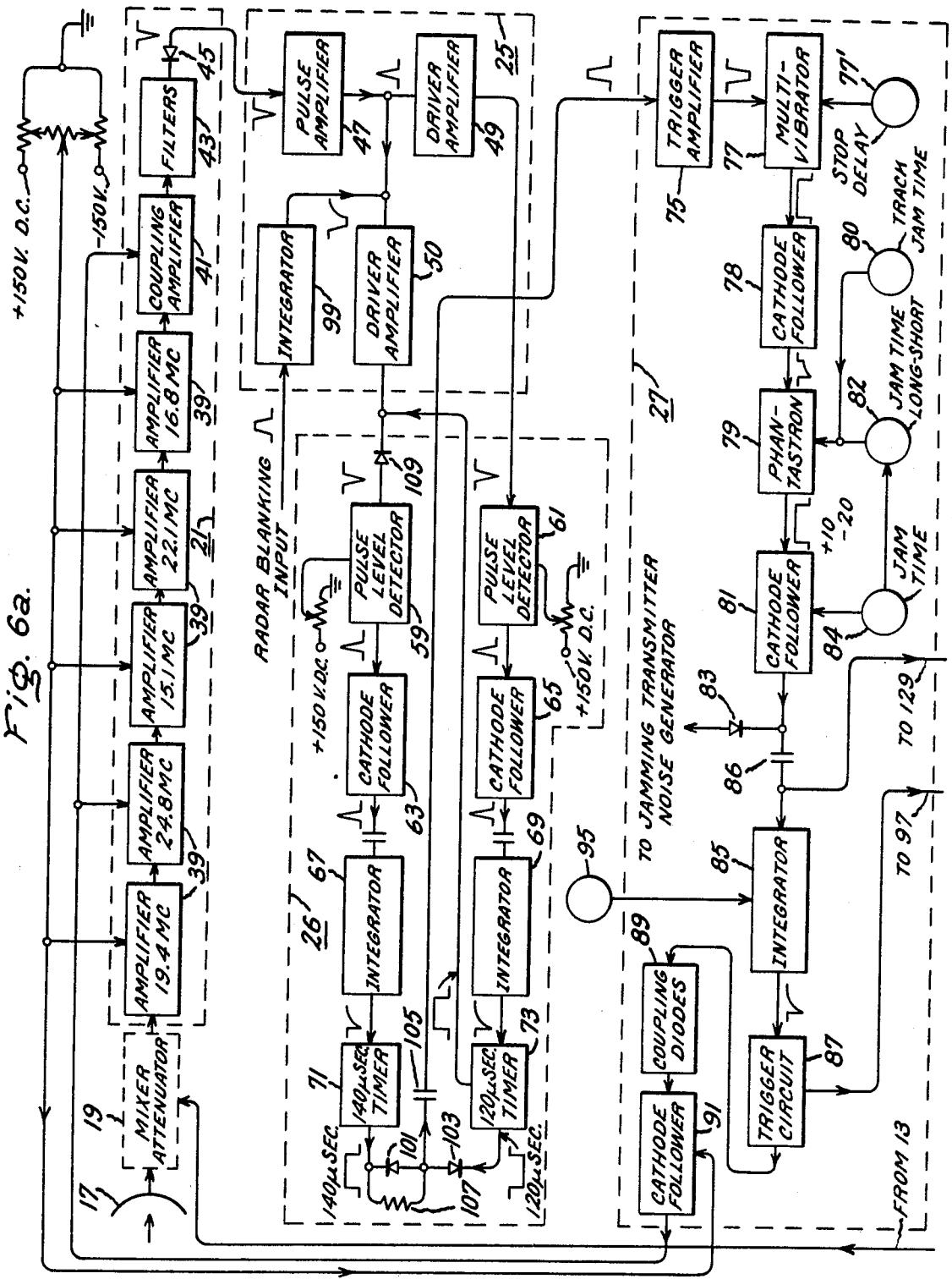

Inventor:
Oliver H. Winn,
by Allen E. Amgott
His Attorney.

AUTOMATIC SWEEP ELECTRONIC COUNTERMEASURES SYSTEM

The present invention relates to electronic countermeasures systems and more particularly to an improved countermeasures system in which there is included an automatic variable sweep technique to increase the duty cycle of a swept jammer equipment.

Airborne electronic countermeasures (ECM) systems have been used primarily to jam unfriendly radar equipment. In general, the ECM jammer radiates a noise-modulated RF signal which enters the victim radar and renders its indicator display useless. The jammer normally operates over a wide range of frequencies and the jammer frequency may be continuously varied from some low value to a higher value. The RF frequency is controlled by servo control circuits included in the jammer equipment. The range of frequency variation is referred to as the sweep width.

In operation of present day ECM swept jammers, the frequency is usually varied at either a sawtooth or triangular rate. A sawtooth variation occurs when the frequency is continuously varied from a low frequency to some higher frequency, then rapidly returned to the low frequency. This sawtooth variation may be referred to as the "slow sweep." The triangular variation occurs when the frequency is continuously varied from a low frequency to some higher frequency, then brought back to the low frequency at the same rate or nearly the same rate. This triangular variation may be referred to as the "fast sweep." As the jammer frequency is being swept, a random noise signal is supplied to the jammer transmitter. This signal amplitude-modulates the RF output. Electro-hydraulic tuning of the jammer oscillator produces the slow or fast sweep signal which causes variations in jamming frequency.

In such prior art electronic countermeasures systems the jamming frequency remains within the victim radar band pass a relatively short time. No means are provided to indicate the location of the radar frequency to be jammed and the system radiates for a relatively long time while jamming for a relatively short time in a given cycle. In order for the system to be effective, noise modulation is applied throughout the operating cycle. Thus these systems have relatively low duty cycles.

The present invention increases the duty cycle of prior art electronic countermeasure systems by providing a system including an automatic sweep technique in which the jamming transmitter, used as a local oscillator, is swept very rapidly while looking for a victim signal. When the victim signal is detected, the sweep rate is changed and the transmitter is caused to slow down when passing through the victim's frequency and jams effectively. Once the victim's frequency is passed, the system is then returned to a search mode to look for another victim signal. Thus, the duty cycle is proportional to the ratio of slow sweep time to total sweep time and can be made extremely high.

Accordingly, one object of the invention is to provide a novel electronic countermeasures system capable of effectively jamming a plurality of victim signals.

Another object of the invention is to provide an automatic variable sweep technique to increase the duty cycle and thereby improve jamming effectiveness of electronic countermeasures systems.

A further object of the invention is to provide in a jamming system automatic means that sweeps very rapidly while looking for a victim signal, and when the victim signal is detected the sweep rate is slowed down during passage through the victim signal.

Still another object of the invention is to provide in a jamming system automatic means that sweeps very rapidly while looking for a victim signal, slowly sweeps through the victim signal when detected, and then sweeps very rapidly while looking for other victim signals.

These and other objects and advantages of the present invention will become apparent by referring to the accompanying detailed description and drawings in which like numerals indicate like parts, and in which:

FIG. 5 is a simplified block diagram of the invention incorporating automatic sweep jamming techniques; and FIGS. 6a–6b, taken together, are a detailed block diagram of a preferred embodiment of the invention shown in FIG. 5.

Anti-jamming techniques in modern radar and communication systems tend to decrease the effectiveness of low duty cycle swept jammers. As mentioned hereinbefore, in present ECM systems the duty cycle is low because the swept transmitter radiates power in portions of the frequency spectrum in which there is no signal to jam.

The effectiveness of a countermeasures system operating against an enemy victim radar is measured directly by the duty cycle of the jammer system, the jammer duty cycle being defined as the ratio of:

$$D_j = t_j/T_j, \text{ where} \quad (1)$$

$t_j$ is the time the radar is jammed, and $T_j$ is the time for the jammer to sweep the frequency band.

It is to be observed that when $D_j$ equals unity, the enemy radar would be jammed 100 percent of the time.

Figure 1:
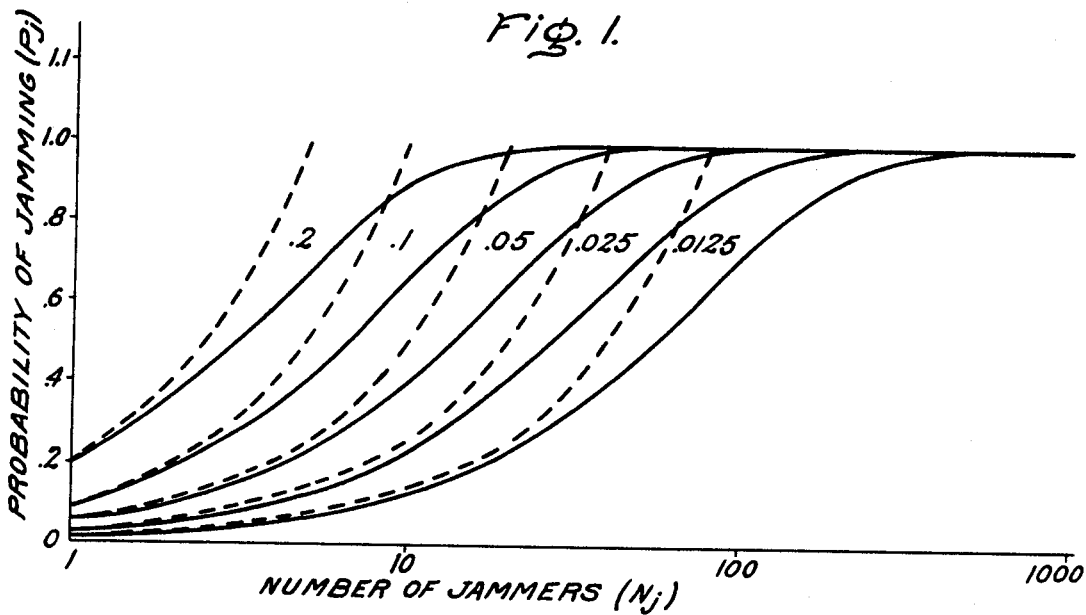
FIG. 1 is a graphical representation showing the probability of jamming as a function of the duty cycle versus the number of jammers.

Increasing the number of jammers operating against one radar effectively increases the duty cycle. In FIG. 1 there is shown a graphical plot illustrating the probability of jamming versus the number of jammers. FIG. 1 shows the probability of jamming as a function of duty cycle as well as the number of jammers indicated as solid curves. The mathematical expression relating to the quantities is:

$$P_j = 1 - (1-D_j)^n \quad (2)$$

where:

$P_j$ is the probability of jamming, $D_j$ is the duty cycle for one jammer, and $n$ is the number of jammers.

Referring to the curves of FIG. 1, it will be noted that for a given value of $P_j$, the number of jammers required varies inversely as the duty cycle. In other words, if the duty cycle is doubled, the number of jammers required is approximately half. Further, for a given number of jammers operating in a given frequency band, the probability of jamming varies directly as the duty cycle. Therefore, an increased duty cycle is extremely desirable.

The dotted curves shown in FIG. 1 illustrate the additional improvement obtained by equivalent synchronizing of the jammers. These dotted curves can be represented by the expression:

$$P_j = nD_j \quad (3)$$

The curves indicate that the duty cycle is paramount to increased penetration capability.

From the description presented hereinbefore, there has been shown how increased penetration capability can be obtained by increasing the duty cycle. It is extremely desirable to further enhance the effective duty cycle of the jammer. For example, consider a given spectrum which is B megacycles wide. N jammers operating in this band must locate all the enemy radars operating in the band and, after locating the radar, spend the maximum time jamming them. Also, when a greater number of radars are present in a given spectrum than the number of jammers available, provision must be made to counter all the radars present at least part of the time, rather than leaving the excess radars unjammed. It is to be observed that in order to accomplish this, continuous sweep of the jammer spectrum is necessary.

Because of these requirements, the present invention is designed to yield a maximum duty cycle by sweeping the jammer spectrum rapidly until the radar is located. Upon locating the radar spectrum, the slow sweep speed mode is initiated to jam effectively. After the radar spectrum is passed, the jammer returns to rapid sweep mode and searches for the next radar spectrum and the operation is repeated.

Figure 2:
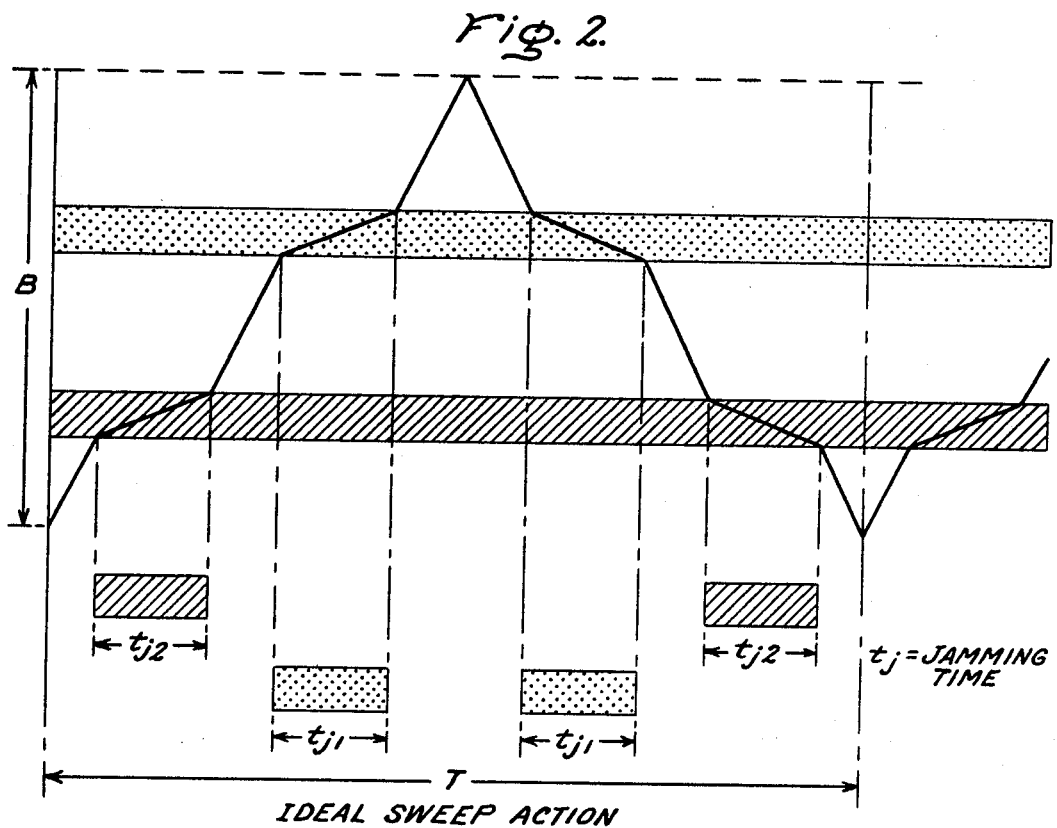
FIG. 2 is a graphical representation of an ideal sweep action desirable in electronic countermeasures system.

The ideal sweep action desired is illustrated in FIG. 2 where the shaded areas represent enemy radar receiver bandpass. For a maximum duty cycle, the following ratio is required:

$$R_f/R_s \to \infty \qquad (4)$$

where, $R_f$ is the fast sweep rate, and $R_s$ is the slow sweep rate.

Figure 3:
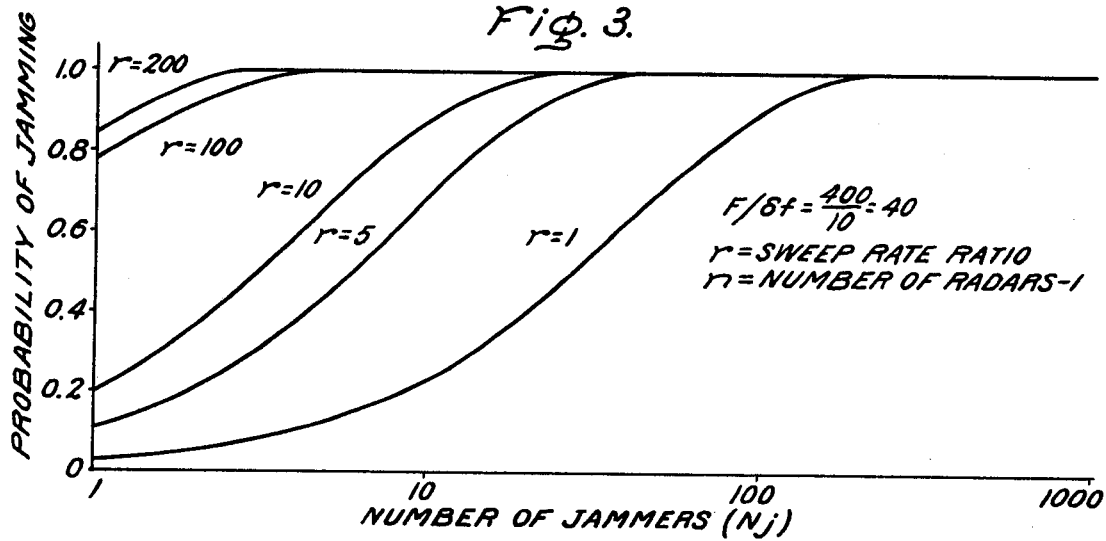
FIG. 3 is a graphical representation of the effect of various sweep ratios included in electronic countermeasures systems.

The ratio expressed in Equation (4) indicates that $R_s$ should be of minimum value and $R_f$ should be as large as possible. As $R_f$ approaches infinity, no time is required to sweep the region not occupied by the enemy radar. Clearly, this would be desirable but impossible to obtain. The effect of various sweep ratios is shown in FIG. 3. Each curve of FIG. 3 illustrates the probability of jamming as a function of the number of jammers for a different fast sweep to slow sweep ratio. These curves can be represented by the expression:

$$P_j = 1 - \left[1 - \frac{r}{\frac{B}{b_{jt}} + n_r(r-1)}\right]^n \qquad (5)$$

where:

$P_j$ is the probability of jamming, $n$ is the number of jammers, $b_{jt}$ is the bandwidth of the jammer transmitter in megacycles, $B$ is the frequency spectrum to be swept in megacycles, $n_r$ is the number of radars to be jammed, and $r$ is the ratio of fast sweep to slow sweep.

In computing the curves of FIG. 3, the ratio of $B/b_{jt}$ has been taken as 40 and $n$ as 1. The curves indicate the immense improvement that can be obtained by utilizing the novel variable sweep technique.

As an example, consider the case when one enemy radar is to be jammed effectively for 80 percent of the total time. The problem is to determine the number of jammers required to accomplish the desired effectiveness with the prior art electronic countermeasures equipment versus the novel variable sweep technique. Substituting the values of $P_j = 0.8, r = 1, B = 400$ Mc, $b_{jt} = 10$ Mc and $n_r = 1$ in Equation (5) and solving for $n$, it is observed that the number of jammers needed is equal to 63.5.

When the novel rapid automatic sweep techniques are employed, where $r = R_f/R_s = 160$ and substituting and solving for $n$, there results in a requirement for 0.9872 jammers. The ratio of $R_f/R_s$, as will be shown hereinafter, is limited to a maximum value because of inherent system delays. However, the improvement of approximately 65 to 1 constitutes a major breakthrough in providing increased penetrating capabilities for effective jamming.

As mentioned hereinbefore, the present invention is designed to increase the duty cycle of a jamming transmitter by automatic variable sweep means. The oscillator of the ECM jamming transmitter is employed as a receiver local oscillator and is swept very rapidly while looking for a victim signal. When the signal is detected, the sweep rate is changed and the transmitter is caused to slow down in a track mode while passing through the victim signal for effective jamming. The system is then returned to a search mode to look for another victim. Included in the improved ECM system are detection means that permit sufficient time to change from the fast sweep mode to the slow sweep mode before jamming commences.

In present day jamming equipments, the transmitter employs a noise-modulated, magnetron transmitting tube. This magnetron is tuned through a given frequency (such as shown in FIG. 2) by means of a servomechanism that drives the magnetron plunger. The servomechanism for driving the plunger is described in an article entitled "A New Electro-Hydraulic High-Speed Servomechanism" by C. H. Willard and C. A. Stemmer appearing in Volume 7, Number 5, of Automatic Control, dated November 1957 on pages 14–22. The present invention, a simplified embodiment of which is shown in FIG. 5, includes receiver means that uses the continuous wave output from the magnetron as a local oscillator signal, thus allowing the transmitter and the receiver means to be tuned simultaneously. In the absence of any enemy radar signal in the spectrum of the jammer, the system is tuned at a fast rate, $R_f$. When an enemy radar is operating in the jammer spectrum, the local oscillator signal of the receiver will be constantly varying and heterodyning with any frequencies received. The receiver means is designed to respond to the difference frequency, $f_{IF}$. This frequency is obtained when the magnetron CW frequency, hence the receiver local frequency, is located $f_{IF}$ megacycles away from the radar frequency, $f_r$, as the magnetron tunes toward the radar frequency.

The response signal from the receiver means is used as a trigger to the control circuits that shape the command signal driving the servomechanism. Once the control circuit is triggered, the slope of the servo command signal is reduced to initiate a slow sweep of the magnetron. After an inherent system delay of $t_s$ seconds, the actual slow sweep commences and continues for some predetermined time. At he end of the time interval, the control circuits change the slope of the servo command signal, which returns the system to the fast sweep mode. During the slow sweep mode, the transmitter magnetron is modulated with noise to effect jamming. In addition, the receiver means is blanked-off the instant the control circuits are triggered. The time interval for the slow sweep mode is long enough so that the system sweeps beyond the frequency $f_r$ of the enemy radar plus the difference frequency of the local oscillator signal $f_{IF}$. At the end of the time interval, the receiver means is turned on. This method prevents the system from being triggered by the image response.

From the discussion presented above, it is evident that the system response to sweep command changes determines the intermediate frequency, in this case, $f_{IF}$, to be used in the receiver means. The mathematical expression relating the intermediate frequency to system and environmental parameters is given by the following equation:

$$IF = (t_s R_F) + b_r + (b_{jr} - b_{jt})/)2), \qquad (6)$$

where:

$IF$ is the intermediate frequency in megacycles (Mc), $t_s$ is the servo delay time in seconds, $b_r$ is the enemy receiver bandpass in Mc, $b_{jt}$ is the jammer transmit spectrum, $R_f$ is the fast sweep rate in megacycle per second squared, and $b_{jr}$ is the jammer receiver bandpass in megacycles.

Figure 4:
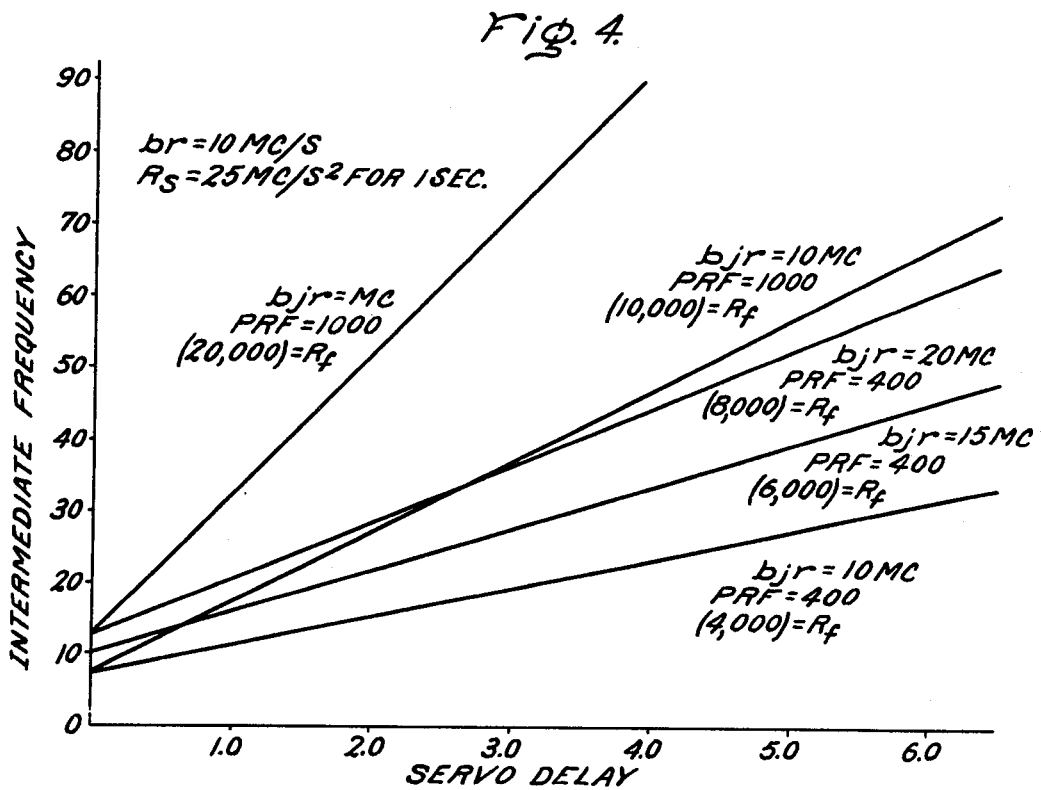
FIG. 4 is a series of curves of intermediate frequency versus servo delay.

Reference will now be made to FIG. 4 in which there is shown a series of curves of intermediate frequency versus servo delay, computed by using Equation (6). Each curve represents a constant value of fast sweep rate, $R_f$. It is to be noted that an assumed enemy radar bandpass, $b_r$, of 10 Mc and jammer transmit spectrum, $b_{jt}$, of 15 Mc per second were used. A slow sweep rate of 25 Mc per second squared for a time interval of one second was also assumed. These assumptions are justified when operating against a tracking radar. The maximum search (fast) sweep rate is determined by the relation:

$$R_f(\max) = b_{jr} PRF ), \qquad (7)$$

where:

$R_f$ is the maximum search (fast) sweep rate in megacycles per second squared, $b_{jr}$ is the jammer receiver bandpass, and $PRF$ is the pulse repetition frequency of the enemy radar.

The curves in FIG. 4 indicate the maximum fast sweep rate is set by enemy radar pulse repetition frequency ($PRF$) and the novel receiver means bandwidth. The radar $PRF$ is beyond the jammer's control, and once it is determined what type radar is to be jammed, that is, search or track, the PRF is set. Therefore, essentially, receiver bandwidth is the only variable in the system. Also, high values of $R_f$ are desirable; but to increase $R_f$, the receiver bandwidth must increase. When this is done, the "set on" accuracy deteriorates. In addition, for maximum effectiveness, that is, increased duty cycle, the ratio $R_f/R$ should be high and the IF of the receiver low. These two factors oppose each other however in a system where servo delay is fixed.

It will be further noted that search radars will have an illumination time proportional to antenna bandwidth and inversely proportional to antenna rotation rate. Illumination time for the majority of search radar at S-band would be in the order of 0.1 to 0.2 second. In a high signal density area, if the slow sweep time were greater than the illumination times, the performance would be degraded. As previously pointed out, whether a search or track radar is to be countered, the fast sweep rate is designed to be as high as possible if the IF frequency and the servo delay is fixed. Therefore, when switched to counter search radars, the slow sweep rate, $R_s$, increase will be inversely proportional to the change in slow sweep interval as required for the illumination times of radars that will be encountered in the frequency range of interest.

In FIG. 5 there is illustrated in block diagram form a simplified embodiment of the invention. As shown therein, a conventional jamming transmitter 11 that radiates a noise-modulated RF signal, operable over a wide range of frequencies, the jamming frequency of which may be continuously varied from some low value to a higher value and in which the RF frequency is controlled by a servo control and power supply circuit (electro-hydraulic tuning means) is connected through a conventional directional coupler 13 to an antenna 15 for radiating electromagnetic waves. Directional coupler 13 in one embodiment is a double-ridged, X-band coupler and provides a means for obtaining an attenuated RF sample of the unmodulated transmitter output. Receiver means 12 are provided to monitor victim radar signals in order to determine the frequency to be jammed and to provide a driving voltage which sweeps the transmitter frequency over the desired bandwidth. In addition, control and timing voltages are provided to slow down the sweep of the jamming transmitter when it is within the victim radar bandpass and to gate off the noise modulation to the jammer RF output during the search mode.

The receiver means 12 includes an antenna 17 for picking up victim signals. This signal is applied to a balanced mixer stage 19 which is coupled to an IF amplifier and detector stage 21, a video amplifier stage 25, a delay noise rejection stage 26, and control and timing stage 27 including gate and trigger circuits. The gate and trigger circuits are connected in circuit with a slope generator stage 29 which in turn is coupled to a servo drive mechanism 31 which is coupled to the plunger in the magnetron of transmitter 11.

In operation, the system as shown in FIG. 5 will perform in the following manner. With no victim signal being received by antenna 17, the transmitter 11 sweeps over a prescribed frequency band, part of the transmitter power is fed into balanced mixer 19 through directional coupler 13. Directional coupler 13 provides a means for obtaining an attenuated RF sample of the unmodulated output from transmitter 11. This RF sample is used by the receiver means 12 as a local oscillator signal.

The separate antenna 17 is required to supply signal energy from a victim signal to the balanced mixer 19. Directional coupler 13 extracts energy from the transmitter transmission line for injection into the mixer as local oscillator power. Thus, the receiver means is basically a superheterodyne receiver which uses a transmitter signal as the local oscillator signal. When a victim's signal is intercepted by receiving antenna 17, it is applied to the balanced mixer 19 and the transmitter is swept until it arrives at a frequency such that the difference from the transmitted and received frequency is equal to the intermediate frequency, the difference signal. This difference signal, derived from mixer 19 is applied to an IF amplifier and detector stage 21 for amplification and detection. The detected output from stage 21 is amplified in video-amplifier 25 and then fed through a delay and noise rejection circuit 26 for application to the gate and timing circuits 27. The timing circuit turns on the noise modulation in the transmitter 11 and programs the slope generator 29 to change the rate of sweep of the transmitter. The transmitter sweep is thereby slowed and the noise modulated power output from transmitter 11 is propagated by antenna 15 at the victim signal frequency.

The purpose of the delay and noise rejection stage 26 is to allow the transmitter 11, which is separated in frequency by the intermediate frequency at the time of intercept to sweep close to the victim's signal frequency before the rate is changed. A blanking gate from gate and timing circuit 27 is also applied to the IF amplifier stage 21 during the jamming period and maintains this amplifier in an off condition until transmitter 11 sweeps past the image frequency. After jamming, the transmitter is returned to the fast sweep mode. This cycle is repeated when the same or another victim signal is intercepted.

Thus, it can be seen that the present system utilizes the magnetron oscillator of transmitter 11 as a superheterodyne receiver local oscillator. This oscillator is swept very rapidly while looking for a victim signal. When the signal is detected, the sweep rate is changed and the jammer transmitter 11 sweeps slowly through the victm's signal, thereby increasing the length of "dwell time." This slow rate of sweeping is maintained for a programmed length of time before the sweep speed is changed back to the high speed "search" mode. The high search mode thereby minimizes the time spent searching, and the slow jamming rate maximizes the time spent jamming with the result that the overall jamming duty cycle is greatly increased over the duty cycle obtainable with a simple, sweep jammer.

Figure 6B:
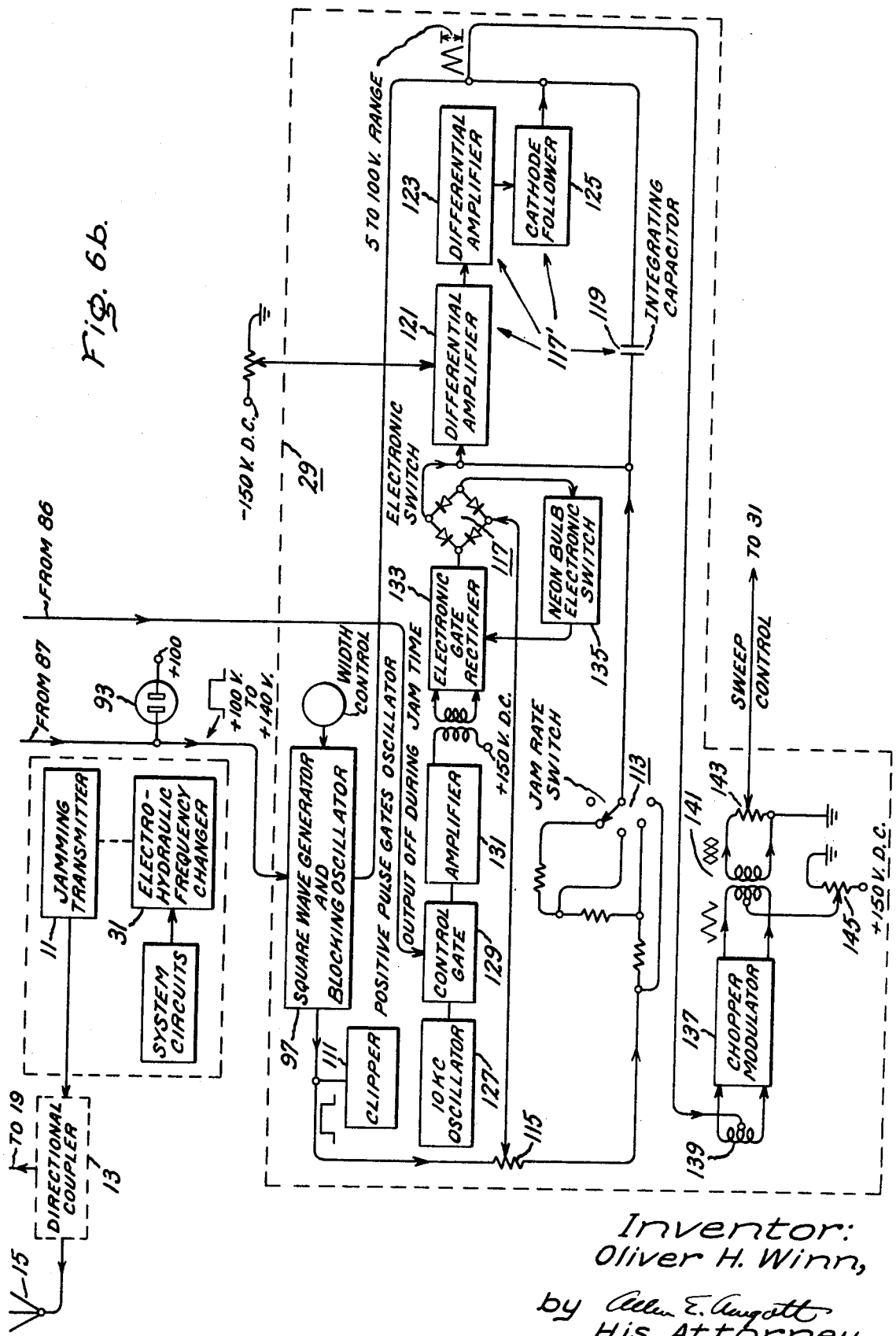

In order to more fully appreciate the invention as disclosed hereinbefore, there is shown in FIGS. 6a–6b a detailed block diagram of applicant's inventive concept. It will be recognized by those skilled in the art that the circuits shown in FIGS. 6a–6b are well-known in the art and, therefore, no detailed explanation need be given for the particular circuits included therein.

The receiver means 12 shown in FIGS. 6a–6b includes; directional coupler 13, mixer attenuator 19, IF amplifier and detector stage 21, video amplifier stage 25, delay and noise rejection stage 26, control and timing stage 27, and slope generator stage 29. In the following discussion the assumption will be made that the frequency of the radar to be jammed (victim signal) is fixed.

As mentioned hereinbefore, the local oscillator signal to the receiver means 12 is supplied by the RF oscillator in the jammer transmitter 11. This oscillator signal is attenuated by the directional coupler 13 and in an attenuator (not shown) included in mixer 19. The oscillator signal is then heterodyned with the signal from the victim radar received by antenna 17 and fed to mixer 19. Directional coupler 13 provides the means for extracting an attenuated RF sample of the unmodulated transmitter output from the transmission line. This RF sample is used by the receiver means as the local oscillator signal. After the local oscillator signal is attenuated by the directional coupler 13, its amplitude is further attenuated by the mixer attenuator 19 to achieve the best signal-to-noise ratio.

Mixer 19 in one embodiment comprised a pair of matched crystals to assure local oscillator noise and video cancellation. The crystals are biased in a forward direction so that the mixer conversion loss becomes less dependent upon the local oscillator level, the mixer operates with less than normal local oscillator power, and the mixer output impedance is reduced making possible a better impedance match to the output coaxial cable. A 20 db attenuator (not shown) may be included in the mixer assembly to further reduce the local oscillator power derived from the jammer transmitter 11 and makes possible a better impedance match to the coaxial cable between mixer 19 and directional coupler 13.

IF amplifier and detector stage 21 provides a broad bandpass with sharp cutoff. Sharp cutoff is desired in order that variations in received signal amplitude will have little effect on the receiver signal interception point as it searches. As seen in the drawing, IF amplifier and detector stage 21 includes a plurality of IF amplifier stages 39, a coupling amplifier 41, filter means 43 and detector means 45. The IF amplifiers 39 are staggered to produce proper IF response. In addition, the amplifier interstage coupling circuits (not shown) are peaked to the frequencies indicated in the drawing. Each of the amplifiers is tuned to its separate frequency by a slug-tuned indicator (not shown). Filters 43 are constant K-type filters with M-derived half-sections. These are used to further increases the rate of attenuation above cutoff. Filters 43 are driven by coupling amplifier 41.

The signal from filters 43 is fed into a detector 45. In one embodiment detector 45 is a doubling type, half-wave diode detector and includes a pair of crystal diodes forward biased by a voltage divider and through a load resistor (not shown). The detector efficiency variation caused by temperature effects is minimized with this particular type arrangement. Further, the detector circuit is so arranged that the video output is a negative pulse. This negative pulse is the "sensing pulse" for the system and initiates all other functions therein.

Video amplifier stage 25 includes a pulse amplifier 47 and driver amplifiers 49 and 50. Connected to the video amplifier stage 25 is a delay and noise-rejection stage 26 to which is coupled control and timing stage 27. The circuits included within stages 25, 26 and 27 will hereinafter be referred to as pulse and timing circuits.

The pulse and timing circuits provide the following function control signals:

a. Stop delay–determines delay between receipt of pulse from video detector and start of noise jamming;
b. Jam time–determines the time that noise modulation is turned on in the jammer transmitter 11; and
c. Image blanking and track offset–produces the IF blanking pulse that turns off IF amplifier 21 during jamming; the track pulse reverses the direction of sweep at the end of the blanking time.

The detected output signal from detector 45 is amplified by amplifiers 47 and 49 and fed to the noise rejection circuit included in stage 26. Said noise rejection circuit includes pulse level detectors 59, 61, cathode followers 63, 65, integrators 67, 69 and microsecond timers 71, 73. The detected signal after amplification in amplifier 47 is also amplified in driver amplifier 50 and fed to noise rejection circuit. If the noise rejection circuit does not reject the signal as noise, a positive pulse input is applied to the grid of trigger amplifier 75.

Multivibrator 77 produces the stop delay interval. The negative pulse output generated by trigger amplifier 75 passes through a diode (not shown) to the plate of one stage of multivibrator 77 and to grid of the other stage of said multivibrator. Thus, one half of multivibrator 77 is driven beyond cutoff. The length of time that it remains cut off depends upon the time constant set up by a stop-delay selector switch 77' and associated circuits (not shown). The stop delay circuit is ineffective during tracking operations. During sequential operation, the circuit time constants are so adjusted to provide a means of allowing the local oscillator frequency to continue sweeping until it reaches the victim frequency. In order to initiate the jam time at the end of the stop delay interval, a trigger is derived by conventional differentiating means from the trailing edge of the stop delay pulse.

The circuits including cathode follower 78 and phantastron 79 with associated components (not shown) form a phantastron time-base generator. A square, positive pulse is developed at the screen grid of phantastron 79. This square positive pulse has a time base that is used as the jam time. It is the time period during which slow tuning takes place in the system. The duration of the phantastron output during track operation is determined by the time constant of the circuits and by the setting of potentiometer 80. The duration of the phantastron output during sequential mode operation, with the switch 82 in the "long" position, is determined by the time constant of the circuits and by control 84. When switch 82 is in the "short" position, a much shorter jam time is obtained.

The output of the phantastron during jamming time is coupled to cathode follower 81. Cathode follower 81 supplies a negative voltage via diode 83 to video amplifiers (not shown) in the jammer transmitter 11 when the system is not jamming in order to gate off the noise modulation. During jamming, this negative gate is removed. Also during jam time, the positive output of cathode follower 81 is fed to the slope generator stage 29 to ground the output of the 10 KC oscillator 127, thereby stopping the fast sweep. After jam time, the positive output is removed and fast sweep is again initiated.

During operation of the phantastron, at the start of jamming time, the positive pulse at cathode follower 81 is fed to the grid circuit of discharge tube 85. Discharge tube 85 acts as a Miller integrator. Capacitor 86 immediately charges from this low impedance source. Inversion takes place in the tube 85 which forces one half of Schmitt trigger circuit 87 into nonconduction. Schmitt trigger circuit 87 is bistable. Either half of trigger circuit 87 conducts at any given time, with an instantaneous change of state taking place upon triggering.

Prior to the occurrence of the jam timing pulse, the second half of trigger circuit 87 is cut off. Because the plate voltage of the second half of trigger circuit 87 is high, coupling diodes 89 are conducting and a rectifier associated with said coupling diodes (not shown) is back biased. Receiver gain control circuits (not shown) set the voltage at the grid of cathode follower 91, the cathode of which is connected to the receiving circuits of the IF amplifier stage 21. During the phantastron pulse, the first half of trigger circuit 87 becomes non-conducting due to the negative output of Miller integrator 85, and the plate voltage rises from a pre-jam time value of +100 volts, DC to a value of +140 volts, DC. When jam time is in effect, a jam indicator 93 illuminates. The negative output voltage from cathode follower 91 is fed to the grids of coupling amplifier 41 and second IF amplifier 39, thus blanking the receiver IF strip.

Upon termination of the pulse, the amplifier circuit of integrator 85 together with capacitor 86 in effect becomes a capacity multiplier, creating an effect identical to that of an equivalent capacitor of value C × A, where A is the stage gain of integrator 85. Slow discharge of capacitor 86 takes place through a resistor (not shown). Therefore, the first half of circuit 87 remains non-conducting until the grid voltage of integrator circuit 85 drops sufficiently low. This drop occurs as the multiplied capacitor discharges. Restoration of receiver gain, therefore, is delayed following the jam time interval. This delay time is known as the image blanking time and prevents retriggering due to response to the image frequency as the local oscillator resumes fast sweep. During sequential operation, this delay is adjustable by means of an Image Blank potentiometer. During track operation, the image blanking time depends upon the setting of Track Off-Set Control potentiometer 95. The setting of potentiometer 95 also determines the duration of fast sweep before the sweep is reversed. When the plate voltage of trigger circuit 87 suddenly increases, multivibrator 97 in slope generator stage 29 changes states so that the direction of sweep is reversed. The image blanking period is adjustable in time.

To provide radar blanking capability, a Miller integrator 99 is incorporated into the pulse and timing circuits to blank these circuits to radiated pulses from other equipment in the aircraft. Normally, the grid of the first half of integrator 99 is at a high negative potential. When blanking is desired, a positive blanking input pulse of limited duration is applied from a circuit (not shown) to the integrator 99. A very rapid negative-going sweep of 0.2 microsecond duration appears at the plate of the integrator 99. The plate voltage bottoms until the blanking pulse is removed. At this time the plate voltage rises slowly at an expotential rate dependent on the RC network included in the integrator. The circuits remain insensitive for 2.0 microseconds after the pulse is removed, and recover to within 3 db of full sensitivity in 10 microseconds or less after the trailing edge of the blanking pulse.

The noise rejection circuits included in stage 26 will now be described in greater detail. Negative pulse outputs from the amplifiers 49 and 50 are fed to the noise rejection circuit. The output from driver amplifier 49 is applied to the grid of noise level detector 61. The other output from driver amplifier 50 is applied to the grid of pulse level detector 59. The positive output pulses of detectors 61 and 59 are then applied to the grids of cathode followers 65 and 63, respectively. The cathode output of follower 65 is sent through a diode (not shown) to the grid of Miller integrator 69 while the output of cathode follower 63 is fed to the grid of Miller integrator 67 via a diode (not shown). Both capacitors connected between cathode follower 63 and integrator 67 and cathode follower 65 and integrator 69 immediately and simultaneously discharge from the low impedance sources presented by the cathode followers. Inversion takes place in integrators 69 and 67 driving the grids of timers 73 and 71 beyond cutoff. The circuits associated with timers 73 and 71 comprise bistable Schmitt trigger circuits. The circuit 73 acts as a 120-microsecond timer while the circuit 71 functions as a 140-microsecond timer. The timing is determined by the constants of integrators 69 and 67. The plate voltages of tubes 73 and 71 rise sharply as a result of the abrupt cut-off of their grids.

It is to be observed that integrators 69 and 67 remain nonconducting until the grid voltages of tubes 65 and 63 drops sufficiently low while the multiplied capacitor discharges. The plate of tube 73 is triggered by its increasing grid voltage approximately 120 microseconds after the pulse input to cathode follower 65. The plate voltage drops to its initial voltage. The rising grid voltage of tube 71 does not trigger its plate until approximately 140 microseconds after the pulse input to cathode follower 63. During the 120-microsecond interval, no conduction takes place through rectifier 101 while conduction does occur through rectifier 103. The junction of capacitor 105 and resistor 107 is held at approximately 100 volts positive. Between 120 microseconds and 140 microseconds after the pulse, neither rectifier 101 nor 103 is conducting and the junction of capacitor 105 and resistor 107 returns to +150 volts. The charge of voltage is coupled through capacitor 105 as a 50-volt positive pulse to trigger the stop delay or trigger amplifier 75. After 140 microseconds, conduction occurs through rectifier 101 but not through rectifier 103 and consequently, the junction of capacitor 105 and resistor 107 returns to its normal value of +100 volts.

The positive output pulse developed at the plate of timer 73 is also applied to diode 109 as back biasing and prevents the negative pulse inputs from driver 50 from entering the integrating and timing circuits of the 140-microsecond network. Since capacitor 105 charges and a positive output from 73 occurs each time a pulse is applied to the capacitor, then pulses which are less than 120 microseconds apart are prevented from entering the 140-microsecond circuits to restart the timer. Since the 120 microseconds timer 73 can be restarted, and the input to the 140-microsecond timer 71 is blanked and this timer cannot be restarted, the output pulse from the circuit 73 can extend beyond the completion of the 140-microsecond pulse. In this case, a trigger will not be produced. Thus, any pulse repetition frequency higher than approximately one one hundred and twentieth microseconds will not trigger the stop delay.

The slope generator stage 29 generates the waveforms necessary for rapid and slow tuning of the system. The most important circuit of this generator is the bistable flip-flop consisting of both halves of multivibrator 97 and associated components. During search operation, as the system searches for a victim signal, this flip-flop produces square waves at each plate.

Since the plate voltage of the conducting tube is low, there is impressed a low voltage on the grid of the cutoff tube; whereas the high voltage at the plate of the cutoff tube results in a high voltage on the grid of the conducting tube. Thus, a stable state is maintained. If an impulse is placed on either grid in the proper polarity to upset this stable condition, regenerative action rapidly transfers the conducting state from one tube to the other. For instance, if a negative pulse is injected into the grid of the conducting tube, a decrease in plate current results with consequent increase in plate voltage. This increased plate voltage increases the grid voltage on the non-conducting tube causing conduction to start which results in a lower plate voltage on that tube. The lower plate voltage on the tube which is beginning to conduct causes a further reduction of grid voltage on the tube originally receiving the negative trigger. This regenerative action rapidly causes the first tube to be cut off and therefore, the transfer to the second stable state is complete.

The other circuit which is part of the overall bistable circuit is a voltage comparator commonly known as the "multiar." This circuit employs a regenerative loop to produce a pulse when two input voltages are equal. Two such comparators are used.

The output from multivibrator 97 is modified by clipper circuit 111. The voltage at the cathode of circuit 111 produces a −35 volt reference for the clipper circuit. Included in said clipper circuit are a plurality of diodes. These diodes provide for clipping the output of the multivibrator 97 at 0 and −35 volts. This is done to eliminate the effects of any unbalance between vacuum tube sections. Further, circuitry included in clipper circuit 111 performs a gating function to allow a change in the state of flip-flop 97 when a track off-set trigger is received.

The rate of change of the jamming frequency of the system is controlled by a jam rate selector switch during sequential jamming and a track jam rate selector switch during track jamming. For simplicity, both switches are shown as one in the drawing and designated 113. A search rate control in the form of potentiometer 115 selects the amplitude corresponding to the rapid sweep.

An integrator of the Miller or amplified-time constant type is included in slope generator stage 29. Because the circuit components within the integrator are fixed, an output results which depends only upon the input waveform. When a square wave is used for input, the character of the output depends only on the amplitude of the input. Because this circuit integrates the input square wave, a triangular output wave results. Integrator 117' includes capacitor 119, differential amplifier 121, differential amplifier 123, cathode follower 125 and associated circuits. Component values and input amplitudes may be selected which determine the slope of the output triangular wave.

Diode bridge circuit 117 is used as an electronic switch which is open only when a signal has been intercepted and when slow tuning is desired. Its action is as follows. 10 kc oscillator 127 and amplifier 131 comprise an audio oscillator and amplifier, respectively. The 10 kc voltage produced is transformer-coupled to a full wave bridge rectifier 133. As the receiver portion of the system tunes rapidly, this voltage is present and the integrator bridge circuit conducts through coupling neon glow tube 135. Thus, the rate of tuning (triangle slope) is determined by the amplitude of input preset potentiometer 115 and a resistor associated therewith (not shown) connected to bridge circuit 117.

During the jamming time interval, the positive output of cathode follower 81 is routed through control gate 129 which includes a pair of diodes, to ground. This effectively connects the output of the oscillator 127 to ground. Therefore, the oscillator input to the bridge rectifier 133 is removed. The coupling neon lamp 135 immediately extinguishes. With electronic switch 117 open, the integrator assembly receives a different amplitude of input, selected by jamming switches 113. The slope of the output triangular wave at cathode follower 125 then becomes very small to slow tune the oscillator during jam time.

A linear variation in voltage with respect to time is achieved by charging or discharging capacitor 119 at a constant current rate. The integrator circuit regulates this action. Since the grid of differential amplifier 121 draws no current, all the current charging or discharging capacitor 119 most pass through a resistance (not shown) in series with the grid of amplifier 121. If a positive square wave from multivibrator 97 is applied to resistors associated with amplifier 121, the grid voltage of amplifier 121 would ordinarily tend to raise the capacitor charging time passing through the resistors. This rise is amplified by differential amplifiers 121 and 123 and fed back via cathode follower 125 in the negative direction to the opposite side of capacitor 119. This amplified wave produces a current very nearly equal in magnitude and in opposition to the original current through the resistors associated with the grid circuit of amplifier 121. Consequently the input grid voltage rise is extremely small and a nearly constant current flows into capacitor 119, producing a linear rise in capacitor voltage. Since the change in grid voltage is small and linear, the feedback voltage from cathode follower 125 must also be linear and is used as output. Exactly the same analysis is applicable in the reverse direction as the negative portion of a square wave is applied.

During jam time, the charging resistance for integrating capacitor 119 is increased by the insertion of additional resistance associated with switch 113. Consequently, the voltage variation with respect to time and, therefore, the frequency variation rate is decreased considerably.

The circuit comprising chopper modulator 137, transformer 139 and associated circuits acts as an electronic chopper. During alternate half-cycles of 400 cycles per second voltage produced at the primary of transformer 139, no triangular output voltage appears at the primary of transformer 141 and the triangular waveform is chopped. The width trim maximum potentiometer 143 at the secondary of transformer 141 determines the fast sweep width by trimming the voltage to be sent to the magnetron servo-control circuit in the jamming transmitter, thereby determining the maximum range of frequencies which the magnetron will cover. Center frequency balance control potentiometer 145 is used to balance the heights of adjacent peaks of the modulated chopped triangular waveform by adjustment of the voltage at the center top of the primary winding of transformer 141.

As mentioned hereinbefore with respect to FIG. 5, there has been provided an improved countermeasures system in which there is included an automatic variable sweep technique to increase the duty cycle of a swept jammer transmitter. While particular embodiments of the invention have been shown and described herein, it is not intended that the invention be limited to such disclosure, but that changes and modifications can be made and incorporated within the scope of the claims.

What is claimed is:

1. An automatic sweep jamming system having a high duty cycle and rapid acquisition rate for jamming victim transmission systems comprising transmitter means capable of being swept very rapidly over a prescribed frequency spectrum for radiating electromagnetic energy, tuning control means coupled to said transmitter for sweeping said spectrum repetitively, receiver means capable of rapidly sweeping said prescribed frequency spectrum to detect electromagnetic energy from victim transmission systems, and means including said transmitter, said tuning control means and receiver means for automatically reducing the sweep rate of said transmitter means for a predetermined period in response to detection of victim electromagnetic energy.

2. An automatic sweep jamming system having a high duty cycle and rapid acquisition rate for jamming victim transmission systems comprising transmitter means capable of being swept very rapidly over a prescirbed frequency spectrum for radiating electromagnetic energy, tuning control means coupled to said transmitter for sweeping said spectrum repetitively receiver means capable of rapidly sweeping said prescribed frequency spectrum to detect electromagnetic energy from victim transmission systems, and means including said transmitter, said tuning control means and receiver means for automatically reducing the sweep rate of said transmitter means for a predetermined period in response to detection of victim electromagnetic energy and returning said transmitter and receiver means to the rapid sweep rate after said predetermined period.

3. An automatic sweep jamming system having a high duty cycle and rapid acquisition rate for jamming victim transmission systems comprising transmitter means including an oscillator capable of being swept in frequency very rapidly over a frequency spectrum for radiating electromagnetic energy, tuning control means coupled to said transmitter for sweeping said spectrum repetitively, receiver means including said oscillator capable of rapidly sweeping said frequency spectrum to detect electromagnetic energy from victim transmission systems, and means for automatically reducing the sweep rate of said transmitter and receiver means in response to detection of electromagnetic energy from victim transmission systems.

4. An automatic sweep jamming system having a high duty cycle and rapid acquisition rate for jamming victim transmission systems comprising transmitter means including an oscillator capable of being swept in frequency very rapidly over a frequency spectrum for radiating electromagnetic energy, tuning control means coupled to said transmitter for sweeping said spectrum repetitively, receiver means including said oscillator capable of rapidly sweeping said frequency spectrum to detect electromagnetic energy from victim transmission systems, and means for automatically reducing the sweep rate of said transmitter and receiver means in response to detection of electromagnetic energy from victim transmission systems and returning said transmitter and receiver means to the rapid sweep rate thereafter.

5. In combination with an electronic countermeasures transmitting equipment which is capable of being continuously varied in frequency from a low value to a higher value to radiate jamming signals over a range of frequencies for countering victim transmission systems, means for automatically sweeping said transmitting equipment sure that the sweep rate of said equipment is slowed down while passing through detected signals from victim transmissions and the sweep rate is returned to its normal sweep rate, said means comprising receiver means capable of rapidly sweeping a range of frequencies to detect signals from victim transmission systems, and means for automatically reducing the sweep rate of said transmitting equipment in response to detection of said victim signals.

6. In combination with an electronic countermeasures transmitting equipment which is capable of being continuously varied in frequency from a low value to a higher value to radiate jamming signals over a range of frequencies for countering victim transmission systems, means for automatically sweeping said transmitting equipment such that the sweep rate of said equipment is slowed down while passing through detected signals from victim transmissions and the sweep rate is returned to its normal sweep rate, said means comprising receiver means including the oscillator of said transmitting equipment capable of rapidly monitoring a range of frequencies to detect signals from victim transmission systems, and means for automatically reducing the sweep rate of said transmitting equipment in response to detection of said victim signals and returning the sweep rate to its normal sweep rate when no signals are detected.

* * * * *